United States Patent
Saito et al.

[11] Patent Number: 5,237,323
[45] Date of Patent: Aug. 17, 1993

[54] MAP RETRIEVING SYSTEM HAVING A LEARNING FUNCTION

[75] Inventors: Takashi Saito, Higashimurayama; Takeshi Maeno, Urayasu; Takeshi Minamino, Tokyo, all of Japan

[73] Assignee: Hitachi, Ltd., Tokyo, Japan

[21] Appl. No.: 784,558

[22] Filed: Oct. 29, 1991

[30] Foreign Application Priority Data
Nov. 21, 1990 [JP] Japan ............... 2-314167

[51] Int. Cl.⁵ ............................ G08G 1/123
[52] U.S. Cl. .................. 340/995; 340/990; 364/443
[58] Field of Search ........... 340/995, 990; 364/449, 364/443, 444

[56] References Cited

U.S. PATENT DOCUMENTS

| | | | |
|---|---|---|---|
| 4,873,513 | 10/1989 | Soults et al. | 340/990 |
| 4,890,104 | 12/1989 | Takanabe et al. | 340/990 |
| 4,899,293 | 2/1990 | Dawson et al. | 340/990 |
| 4,937,592 | 6/1990 | Yamada et al. | 340/990 |
| 4,972,319 | 11/1990 | Delorme | 340/990 |

FOREIGN PATENT DOCUMENTS 2-87594 11/1989 Japan.

*Primary Examiner*—Donnie L. Crosland
*Attorney, Agent, or Firm*—Fay, Sharpe, Beall, Fagan, Minnich & McKee

[57] ABSTRACT

In a map retrieving system, in which map data are stored and when a local area is specified through an input device, one of a plurality of sectional maps constituting a map for a relevant local area is displayed by accessing a data base thus obtained, sectional maps, which were referred to in the past, are displayed with a priority, based on a past reference situation with respect to each of the sectional maps for the local area.

19 Claims, 4 Drawing Sheets

FIG. 3

| ADDRESS | | | | BASIC MAP ADDRESS | | COORDINATE DEVIATION | | COUNT |
|---|---|---|---|---|---|---|---|---|
| NAME OF SHI | NAME OF CHO | NAME OF OAZA | CHOME HOUSE NUMBER | X-COORDINATE | Y-COORDINATE | X-DEVIATION | Y-DEVIATION | |
| A-SHI | a-CHO | | 1ST AVENUE | 2 | 2 | +1<br>0<br>0<br>0<br>-1<br>+1<br>-<br>-<br>-<br>- | 0<br>0<br>-1<br>+1<br>-1<br>+1<br>-<br>-<br>-<br>- | 5<br>3<br>2<br>2<br>1<br>1<br>0<br>0<br>0<br>0 |
| A-SHI | a-CHO | | 2ND AVENUE | 5 | 3 | -2<br>0<br>+3<br>\|<br>\|<br>\| | 0<br>+1<br>-2<br>\|<br>\|<br>\| | 3<br>3<br>2<br>\|<br>\|<br>\| |
| B-SHI | b-CHO | | 100TH AVENUE | 100 | 120 | +7<br>-15<br>-<br>- | -3<br>+7<br>-<br>- | 2<br>1<br>0<br>0 |
| \| | \| | \| | \| | \| | \| | \| | \| | \| |

MAP RETRIEVING SYSTEM HAVING A LEARNING FUNCTION

BACKGROUND OF THE INVENTION

The present invention relates to a map retrieving system applicable to business of displaying maps, etc. in accordance with an inputted address (business of replying to inquiries such as road guidance etc.) and in particular to a map retrieving system capable of searching and displaying maps with a high efficiency by learning maps already utilized.

Heretofore, as a map retrieving system, as described, e.g., in JP-A-1-287594, there is known a system having a function of displaying a relevant map by a one-touch operation, in which when a "local area number" (number assigned to ken or state→shi→cho) (ken, shi and cho mean prefecture, city and town in English, respectively), a house number, a street number, etc. are inputted, maps of the relevant local area and place names are displayed one after another, and the order of display of maps or road maps to destinations used repeatedly is registered.

The prior art technique described above has a "function of inputting previously the order of display of maps", by which maps on a route to an intended destination are displayed one after another according to an itinerary. This is a system useful, e.g., for an autoroute electronic atlas, when a user, who knows all necessary items up to the name of cho and the house number of the position at present and the destination position, utilizes it to refer thereto up to the destination and to display corresponding maps. However a system, in which the order of display of a series of maps is registered and determined, as described above, is not suitable for an answering system used in a guiding station, which should answer inquires from those (e.g., passengers) who know only vaguely their positions at present and destination positions (for the purpose of confirming precisely these positions up to their house numbers). Such an inquiry answering system can be used apart therefrom in the case where a passenger informs a fire station concerned of a fire, which he has found incidentally in a local area, with which he is unfamiliar, etc. In this case, the passenger does not know as far as the house number. Therefore he makes inquiries at a guiding station, an office concerned, etc. about or informs them of a name of cho or names of constructions, which can be marks, such as a building, an advertising board, etc. on the basis of a situation, where he is at present. It can be thought that the guiding station displays suitably several sectional maps of the cho having the relevant name (it is supposed, e.g., that a local area having a name of cho is divided into a plurality of meshes in display image unit) with this due and that it identifies a precise place, where the passenger is, by looking for a target building or mark (of which the passenger talks) therefrom, and informs him thereof. Consequently, for this kind of guiding and answering system it is desirable that it can display at random a plurality of maps (sectional maps) relating to a specified address (name of local area such as a name of cho) and that a map (sectional map), in which the destination is written, is found as soon as possible to be displayed.

However, as the prior art technique described above, no attention is paid to the fact that the order of displays being determined previously, related maps are searched at random, responding to the content of the inquiry from a person who makes inquiries, so as to display a target map in a short time with a high efficiency.

Therefore, the inventors of the present invention have thought as a result of various studies that if this kind of map systems have a learning function and can presuppose to some degree sectional maps necessary for answering an inquiry at that time, e.g., on the basis of data answering inquiries up to that time, it is possible to display rapidly a required sectional map with a high efficiency by selecting it from sectional maps having a high presupposed probability to display it.

SUMMARY OF THE INVENTION

Therefore the object of the present invention is to provide a map retrieving system having a learning function capable of removing the problematical points of the prior art technique described above, by which, in the case where a certain local area is searched by using a map constructed so as to be divided into a plurality of sectional maps in display image unit so that each of the sectional maps can be searched and displayed at random and that a sectional map among them, for which an inquirer, etc. is looking, can be displayed rapidly with a high efficiency.

In order to achieve the above object, a map retrieving system according to the present invention, including display means for displaying a local area (e.g. OO-shi, △△-cho, XX-avenue, etc.) into a plurality of maps (sectional maps) in image unit; a map data storing section (map data base) for storing map data; a place data storing section for storing place data such as residences, sites, etc.; and a control device for controlling the display means, the map data storing section and the place data storing section, is so constructed that it has been learned previously what are maps (sectional maps), which were referred to in the part for a target place (intended place in inquiries, etc.) and that at a succeeding operation a map, which has been referred to and adopted, is displayed with a priority (at first). In this case, sectional maps are displayed in an order of the decreasing number of past references for the relevant local area (cho, etc.).

As concrete means, there are disposed means for registering which sectional map is referred to, when maps (sectional maps) corresponding to the relevant place (target residence, site) are referred to, and counting means for counting the number of references, when the maps referred to for the relevant place have been already registered.

Further the system according to the present invention is so constructed that map data or the maps (sectional maps), which were referred to in the past, are read previously in a main memory in an order of the decreasing number of references so that display of a corresponding map can be effected immediately, when a demand takes place by an inquiry, etc.

Still further the system according to the present invention includes means for displaying which maps (sectional maps) in a group of maps corresponding to the local area including the relevant place (residence, site) the maps read previously in the main memory are and means for displaying how many times the relevant maps have been used by a ratio, etc. (number of uses, frequency of use).

According to the present invention, when an inquiry or a report takes place in order to specify precisely a certain place (e.g., residence, site, etc.) in a certain local area (e.g., OO shi, ΔΔ cho, XX avenue, etc.), in the guiding station, the sectional map having the highest priority (e.g., the sectional map having the greatest number of past references, the sectional map most recently referred to, etc.) is displayed at first and following sectional maps are displayed in an order of decreasing priority on the basis of a result of learning. Since such sectional maps having high priorities have high probabilities of being utilized also in following inquiries (e.g., prominent buildings, advertising towers, etc. are utilized frequently by passengers, etc. as a mark), the target place is contained often in the first displayed map. In this way the hit ratio is raised and it is possible to shorten the search time.

Further, by reading previously several sectional maps referred to in the past in the main memory in the order of the decreasing number of references as first candidate, second candidate, ———, when the first candidate doesn't hit, then the second candidate is displayed. In this way wait time of an operator is shortened and the target sectional map can be found rapidly.

Still further, since which sectional maps in the group of maps corresponding to the relevant local area the sectional maps read previously in the main memory are and how many times they were used in the past are displayed together with the relevant sectional map, when the first display doesn't hit, it is possible to judge easily whether the succeeding candidate map should be selected or not.

BRIEF DESCRIPTION OF THE DRAWINGS

FIG. 3 is a scheme showing the construction of an embodiment of an address-map address converting table;

DESCRIPTION OF THE PREFERRED EMBODIMENT

Figure 1:
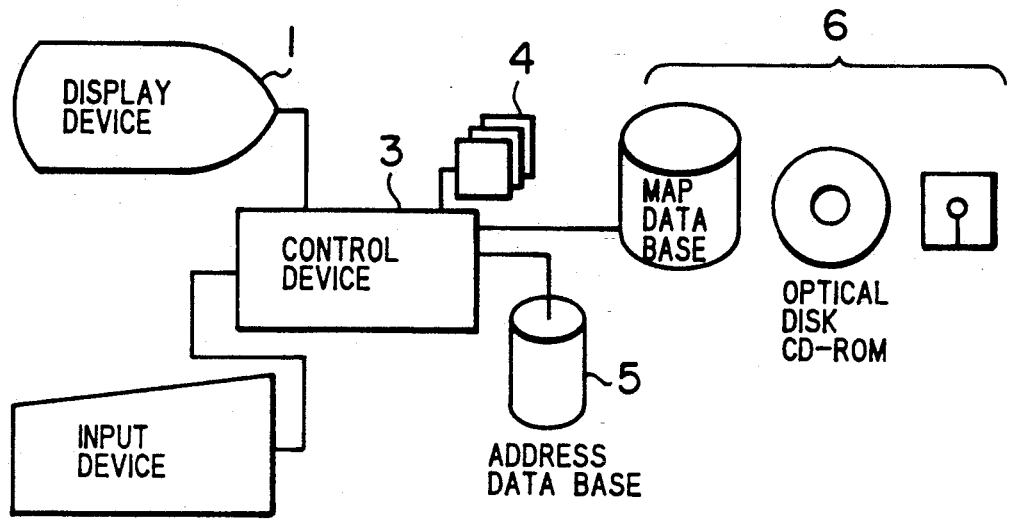
FIG. 1 is a block diagram showing the construction of an embodiment of the map retrieving system according to the present invention.

Hereinbelow an embodiment of the map retrieving system according to the present invention will be explained, referring to the drawings.

FIG. 1 is a block diagram showing the construction of an embodiment of the map retrieving system according to the present invention. A display device 1 displays a map; by using an input device 2 an address of a target map is inputted and a map is selected; a control device 3 controls the system; in a memory 4 map data for display, relating programs, etc. are stored; and address data are stored in an address data base; map data are stored in a map data base (including hard magnetic disks, optical disks, floppy disks, etc.). Here it is supposed that data representing addresses or sites of buildings, facilities, etc. precisely up to road numbers or house numbers are stored in the data bases 5 and 6 in the present example.

Figure 2:
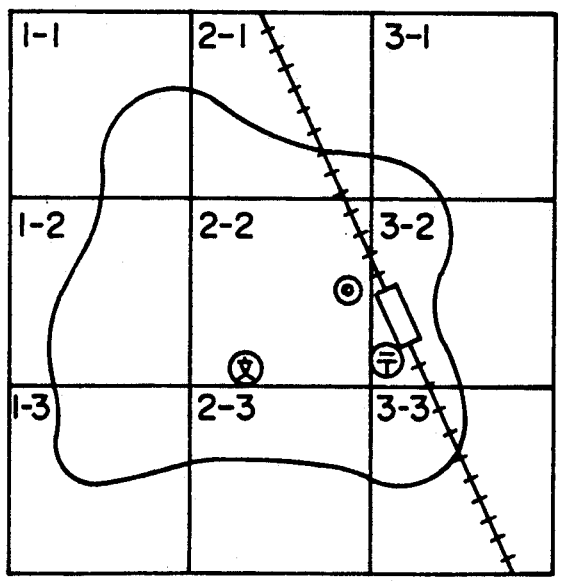
FIG. 2 is a scheme showing the construction of an embodiment of map meshes.

FIG. 2 shows a state, where a map is divided into meshes, each of which has a size, which can be displayed at once (in one image) on a display device. This example indicates that 9 meshes are necessary for displaying a local area of "A shi a cho 1st avenue". Numerals indicated on the left upper side of each of the meshes ("1−1", "2−1", ———) are "map addresses" (abscissa-ordinate) for specifying the maps to be displayed.

FIG. 3 indicates an example of the address file 5 in FIG. 1 or an address-map address converting table (hereinbelow called simply "converting table") existing in the memory 4.

"Basic map address" in this converting table is a map address indicating a map representing a relevant residence. In the example indicated in FIG. 3, supposing that the mesh for the central portion of a cho 1st avenue in FIG. 2 is a region (basic map address) representing the local area of the residence "A shi a cho 1st avenue", an address "2−2" of this mesh is registered. "Coordinate deviation" represents differences between the map address of the sectional map, which is really referred to for the relevant residence, and the basic address, which are denoted by "X deviation" and "Y deviation" for the abscissa and the ordinate, respectively. For example, when the basic map address is "2−2" and the coordinate deviation is "+1, 0", the address of the mesh really referred to is "2+1, 2+0", i.e. "3−2". Further "count" is a value indicating the frequency (number of references) of the meshs, which have been referred to up to that time.

Figure 4:
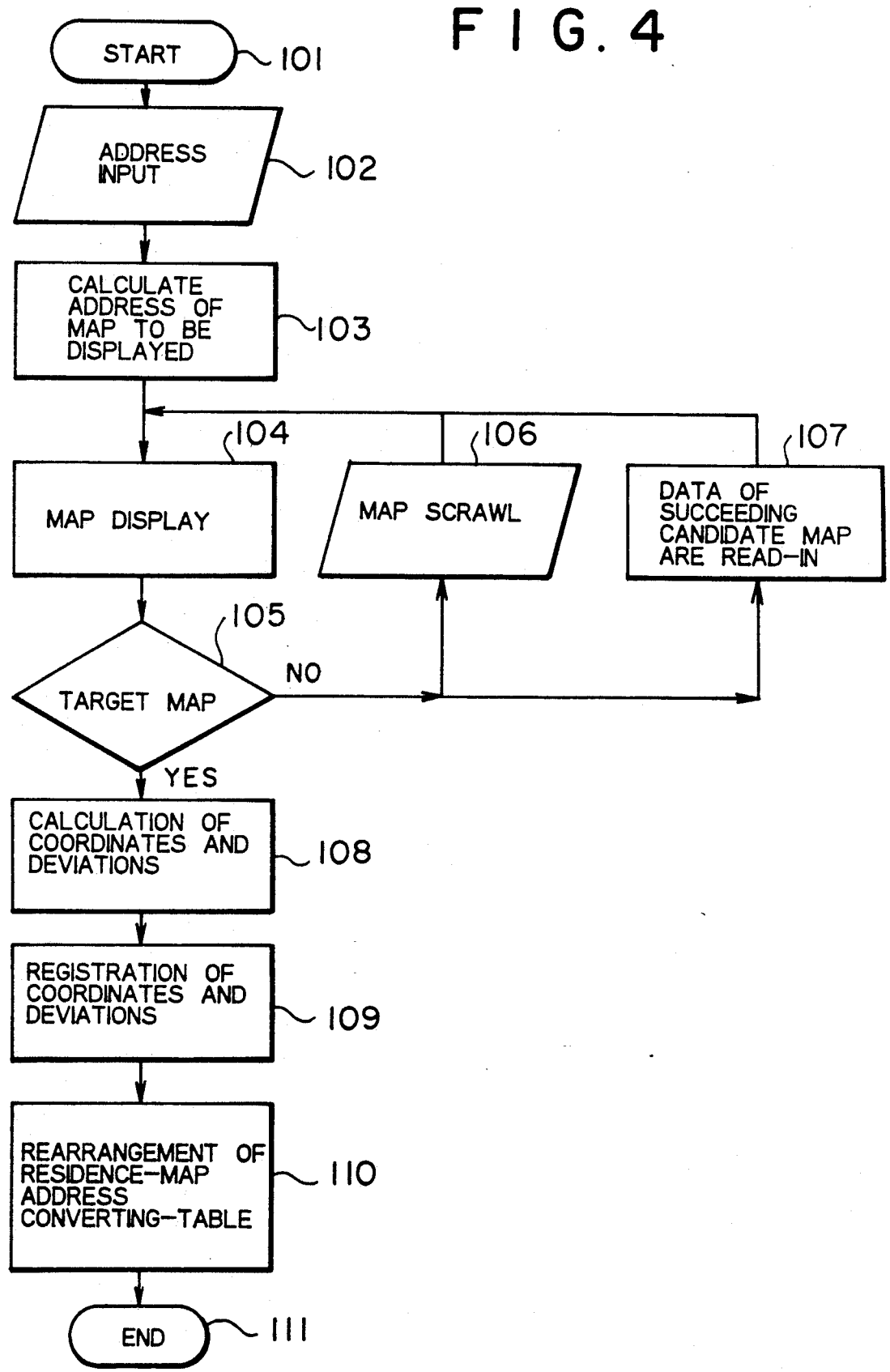
FIG. 4 is a flow chart indicating a procedure of learning a map according to an embodiment of the present invention.

Hereinbelow learning of the map will be explained in detail, referring to the flow chart indicated in FIG. 4. This flow chart indicates a flow of processing effected by the control device 3 under a program control.

For example, in the case where it is desired to display a map of "A shi a cho 1st avenue No. 2" (Step 101), data of the relevant local area or residence (e.g., "A shi a cho 1st avenue") are inputted through the input device and at the same time the converting table is read-in from the address data base 5 (Step 102). Operation is facilitated, if the input device 2 and the display device 1 are so constructed that the address is inputted by pushing down function keys corresponding to the address data or by specifying function indicators displayed on the display device 1. Then the basic map address, which is in accordance with the address data (in this case it is in accordance therewith up to "——— 1st avenue"), is obtained by verifying the inputted address data while comparing them with the converting table. At this time, in the case where the coordinate deviation data are registered, the coordinate deviation data, for which the count value for the relevant address is greatest, are added to the basic map address in order to calculate the map address of the first candidate mesh (Step 103). Then the map of the relevant mesh is read-out from the map data base 6 to be displayed (Step 104).

The operator judges whether that map is the target map or not (step 105). When the search of the relevant map is terminated (e.g., in the case where a mark, etc. indicated by the inquirer were found in the map of the relevant mesh), it is judged that the map displayed at that time is the target map. In the case where it is not the target map, the target map is further looked for by map scroll (Step 106) or coordinate deviation data having the next greatest count value is searched and the next candidate map data are read from the address data base 5 in the main memory 4 (Step 107). Further the process indicated in Step 107 may be effected at the same time as that indicated in Step 104 (so-called previous reading-out may be effected). In this way it is possible to shorten the response time in the case where the operator judges that the target map can be achieved more rapidly by searching the succeeding candidate map than by effecting the map scroll.

Further, in Step 103, in the case where count values of the reference for all the maps are zero (no maps were referred to in the past), the basic map can be the first candidate.

In this way, when the target map is displayed, the difference (coordinate deviation) between the map address of that map and the address of the basic map is calculated (Step 108).

If the coordinate deviation of the calculation result exists in the converting table, the count value for that coordinate deviation is increased by 1. On the contrary, if it does not exist therein, that coordinate deviation is newly registered and the count value is reset to 1. The learning capacity of the system is increased, if it is provided with about 10 registration areas (Step 109).

When the system has been used for a certain time, since the count values become not in the decreasing order, the data of the converting table are rearranged so as to be in the decreasing order with a predetermined period (Step 110). Further, in Step 110, they may be rearranged also so as to be in the increasing order.

The rearrangement may be in the increasing order, depending on the system. By the process described above the operation of searching and displaying the target map is terminated (Step 111).

Figure 5:
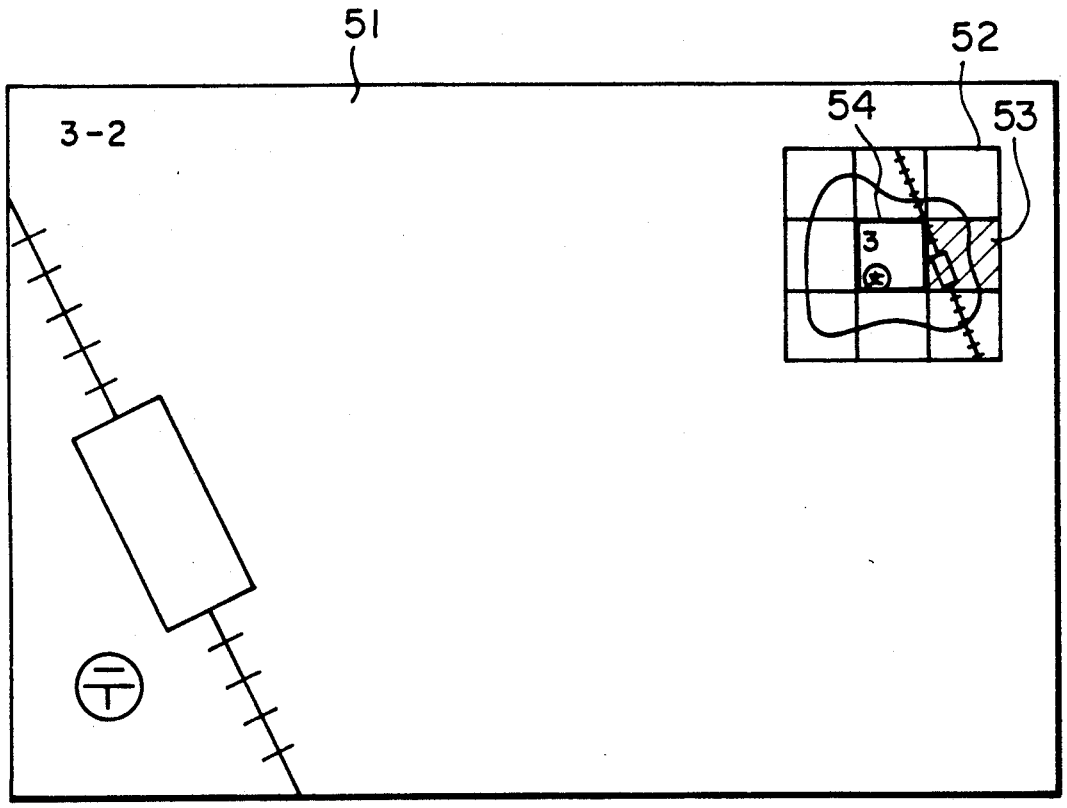
FIG. 5 is a scheme showing the construction of a display image including an example of an indicator indicating the position of the succeeding candidate map.

Further an indicator as indicated in FIG. 5 may be disposed for the purpose of informing the operator of the fact that the succeeding candidate map data have been read-in in Step 107 and at the same time helping him in judging whether it is better to select the succeeding candidate map. In the embodiment indicated in FIG. 5 an image 51 is displayed at that time. An indicator section 52 is inserted in the image in order to let the operator know the succeeding candidate. In this indicator section 52 the position 53 of the mesh representing the map displayed at that time is indicated by hatching and the position 54 of the mesh representing the succeeding candidate map is indicated a frame written in a thick line.

Further a numeral ("3") in the frame written in the thick line represents that this map was referred to three times in the past to be used (frequency of use) and the operator can judge whether the succeeding candidate map should be selected or not.

Further, although, in the present embodiment, the basic map address and the coordinate deviations were used for specifying a map, learning can be effected by giving all the maps unequivocal map addresses without using the basic map address and the coordinate deviations and giving these map addresses count values. That is, map addresses, by which all the map groups (cho, shi, state, etc.) for a plurality of local areas (avenues) are represented by absolute numbers (consecutive numbers), can be used. Further a simplified learning function can be applied also to the present invention, by which a last map referred to is used for the succeeding map display.

As explained above in detail, by using the map retrieving system according to the present invention, in the case where place data such as residences, sites, etc. concerning a certain local area is divided into a plurality of sectional maps, since reference situation, in which how many times each of the sectional maps was referred to in the past, etc. is learned, experience of map operation is used efficiently on the basis of the result of this learning, and a map, in which a target place probably exists, is searched and displayed, it is possible to increase the hit ratio to search a relevant map for the target place, to shorten the search time therefor and to carry out the display with a high efficiency in inquiry businesses such as a road guiding system, an emergency information system, etc.

We claim:

1. A map retrieving system having a learning function comprising:
   display means for displaying data inputted thereto;
   a map storing section for storing a plurality of sectional maps for a local area, each of said plurality of sectional maps being respectively assigned priority data; and,
   a control device, connecting said display means and said map storing section, responsive to a map display instruction inputted thereto, for retrieving a first one of said plurality of sectional maps from said map data storing section based on the highest of said priority data and outputting the retrieved first sectional map with the highest priority data to said display means for display.

2. The map retrieving system according to claim 1, wherein each priority data is historical data indicative of a number of times the associated sectional map was previously retrieved and displayed.

3. The map retrieving system according to claim 1, wherein said control device further comprises means responsive to a next display instruction, for retrieving a second one of said plurality of sectional maps based on the next highest of said priority data with respect to priority data associated with a currently displayed sectional map and outputting the second one sectional map with the next highest priority data to said display means for display.

4. The map retrieving system according to claim 3, wherein said control device further comprises means responsive to each of said map display instruction and said next display instruction, for outputting an indicator to said display means in addition to the retrieved sectional map such that the indicator is displayed together with the retrieved sectional map to indicate a next one of said plurality of sectional maps which has the next highest priority.

5. The map retrieving system according to claim 4, wherein each priority data is historical data indicative of a number of times the associated sectional map was previously retrieved and displayed.

6. The map retrieving system according to claim 5, wherein said control device further comprises means responsive to each of the map display instruction and the next display instruction, for outputting to the display means together with said indicator, the number of times said next one of the plurality of sectional maps with the next highest priority was previously retrieved.

7. The map retrieving system according to claim 1, wherein said control device further comprises means responsive to the retrieval of said first sectional map, for updating the priority data associated with the first sectional map.

8. A map retrieving system comprising:
   display means for displaying data inputted thereto;
   a map storing means for storing maps of a plurality of local areas, each map comprising a plurality of sections;
   designating means for designating a first one of the plurality of local areas based on an identifier of the local area inputted into the designating means and generating a map display instruction; and, control means responsive to the map display instruction, for retrieving a first section among a plurality of sections of a first map for the designated first local area from said map storing means based on priorities respectively preassigned to said map sections, and outputting the retrieved map section to said display means, the retrieved map section having the highest priority.

9. The map retrieving system according to claim 8, wherein each priority is a number of times of the retrieval of a corresponding map section in the past.

10. The map retrieving system according to claim 9, wherein said control means further comprises means responsive to the retrieval of a map section, for updating a priority of the retrieved map section.

11. The map retrieving system according to claim 9, wherein said control means further comprises means responsive to a next display instruction, for retrieving a map section with the highest priority next to a priority of a currently displayed map section from said map storing means to output the retrieved map section with the next highest priority to said display means.

12. The map retrieving system according to claim 11, wherein said control means further comprises means responsive to each of the map display instruction and the next display instruction, for outputting an indicator to said display means in addition to the retrieved map section such that the indicator is displayed together with the retrieved map section, the indicator indicating the map section with the next highest priority.

13. The map retrieving system according to claim 12, wherein said control means further comprises means responsive to each of the map display instruction and the next display instruction, for outputting the number of times of retrieval of the map section with the next highest priority to said display means together with the indicator thereof.

14. A map system for hierarchically retrieving and displaying a map in accordance with stored data, the system comprising:

map data storage means for storing map data indicative of said map to be displayed, the whole area of said map being divided into a plurality of sections, said map data storage means storing map section data representing each of said plurality of sections in a conversion table wherein each of said map section data is stored associated with local area name data representing a name of the section and historical count data indicative of a number of system references to the section data;

an input device for inputting a first local area name into the system from a system user;

map system control means for i) matching a first plurality of stored local area name data in said map data storage means with said first inputted local area name ii) selecting a one of said first plurality of stored local area name data based on the magnitude of the plurality count data associated with said first plurality of stored local area name data and iii) retrieving from the map data storage means as display data the map section data associated with said selected one local area name data; and, display means responsive to said display data for displaying the retrieved map section data.

15. The map system according to claim 14 wherein said map system control means includes means for selecting said one of the first plurality of stored local area name data based on the one of the corresponding first plurality of stored local area name data having the greatest magnitude.

16. The map system according to claim 15 wherein said map system control means comprises means responsive to a next display instruction from said system user for selecting a second one of the first plurality of stored local area name data based on the one of the corresponding first plurality of stored local area name data having the next greatest magnitude.

17. The map system according to claim 16 wherein:

said map system control means comprises means for retrieving from the map data storage means as first display data the map section data associated with said selected one local area name data and retrieving, as second display data, second map section data corresponding to the one of the corresponding first plurality of stored local area name data having the next greatest magnitude; and, said display means includes means responsive to said first and second display data for simultaneously displaying the retrieved first and second map section data.

18. The map system according to claim 17 wherein:

said map system control means comprises means for retrieving from the map data storage means, as third display data, the count data associated with said second map section data; and, said display means includes means responsive to said first, second and third display data for simultaneously displaying the retrieved first and second map section data and the count data.

19. The map system according to claim 14 wherein said map system control means comprises means for incrementing the count data corresponding to said retrieved map section data associated with said selected one local area name data.

* * * * *